(12) United States Patent
Hoover

(10) Patent No.: US 8,373,595 B2
(45) Date of Patent: Feb. 12, 2013

(54) SIMULTANEOUS RADIO DETECTION AND BEARING SYSTEM

(75) Inventor: John Hoover, Matheson, CO (US)

(73) Assignee: On Target Enterprises, Inc.

( * ) Notice: Subject to any disclaimer, the term of this patent is extended or adjusted under 35 U.S.C. 154(b) by 673 days.

(21) Appl. No.: 12/627,767

(22) Filed: Nov. 30, 2009

(65) Prior Publication Data

US 2012/0256793 A1    Oct. 11, 2012

(51) Int. Cl.
*G01S 5/02*    (2010.01)
(52) U.S. Cl. .................................................. 342/428
(58) Field of Classification Search .................. 342/428
See application file for complete search history.

(56) References Cited

U.S. PATENT DOCUMENTS

| | | | |
|---|---|---|---|
| 4,551,727 A * | 11/1985 | Cunningham | 342/418 |
| 5,426,438 A | 6/1995 | Peavey et al. | |
| 7,102,511 B2 | 9/2006 | Chen | |
| 7,262,729 B1 | 8/2007 | Hershey et al. | |
| 7,466,261 B1 | 12/2008 | Hoctor | |
| 7,495,611 B2 * | 2/2009 | Ruffa | 342/428 |
| 2009/0213964 A1 | 8/2009 | Nishidai et al. | |

OTHER PUBLICATIONS

PCT International Search Report for International Application PCT/US2010/058091, search report date of mailing Oct. 14, 2011.

\* cited by examiner

*Primary Examiner* — Harry Liu
(74) *Attorney, Agent, or Firm* — Daniel W. Roberts; Law Offices of Daniel W. Roberts, LLC

(57) ABSTRACT

Provided is a simultaneous radio detection and bearing system. More specifically, the radio detection and bearing system includes an RF conditioning subsystem having a plurality of First Frequency Range and Second Frequency Range signal receiving channels. The RF conditioning subsystem operable to combine First Frequency Range and Second Frequency Range signals as a first internal data stream. A coherent multi-channel digitizer subsystem is coupled to the RF conditioning system, the coherent multi-channel digitizer subsystem operable to generate a time domain snapshot of the first internal data stream. An audio recording subsystem is also coupled to the RF conditioning subsystem. A processor is coupled to the coherent multi-channel digitizer subsystem and the audio recording subsystem. The processor is operable to transform the time domain snapshot to a frequency spectrum and identify at least one signal above a threshold at a determined frequency, determine the bearing of the signal, and provide the determined frequency to the audio recording subsystem. The audio subsystem contemporaneously records the signal upon the determined frequency. An associated method of radio detection and bearing determination is also provided.

43 Claims, 10 Drawing Sheets

SIMULTANEOUS RADIO DETECTION AND BEARING SYSTEM

This invention was made with Government support under contract No. GS23F0264M awarded by the National Security Agency. The Government has certain rights in this invention.

FIELD

This invention relates generally to the field of radio signal detection and bearing determination, and more specifically to systems and methods for simultaneous radio detection and bearing.

BACKGROUND

The radio spectrum is divided up into bands by frequency and corresponding wavelength. For example, Extremely Low Frequency (ELF) ranges from 3-30 Hz and Super Low Frequency (SLF) ranges from 30-300 Hz. Ultra Low Frequency (ULF) ranges from 300-3000 Hz, Very Low Frequency (VLF) ranges from 3-30 kHz and Low Frequency (LF) ranges from 30-300 kHz. Medium Frequency (MF) ranges from 300-3000 kHz and is common for AM broadcasts. High Frequency (HF) ranges from 3-30 MHz and is common for shortwave and amateur radio broadcasts. Very High Frequency (VHF) ranges from 30-300 MHz and Ultra High Frequency (UHF) ranges from 300-3000 MHz and both are common for television as well as general radio transmission. Super High Frequency (SHF) ranges from 3-30 GHz and Extremely High Frequency (EHF) ranges from 30-300 GHz, and both are applicable to microwave devices.

The UHF and VHF frequency ranges in particular are extremely common for hand held radio transmission and reception. Operable over varying distance bearings depending on geography and power of the transmitter these devices permit one or more parties to communicate verbally. In some situations data transmission may also be performed.

As with normal face to face communication, the duration of a transmission may be extremely short. Often these radios may be used between family or business parties for a wide range of communication needs. Further still, these radios may be utilized in search and rescue operations where the transmitting party has limited or reduced power and/or may be week from injury and therefore unable to maintain contact for long. More concerning, these radios are also frequently employed in clandestine operations. The signal to give a command or indicate the arrival of a party or other event may be extremely brief, yet have profound consequences.

Indeed whether for defense, the location of a lost party, or other purpose, it is often highly desirable to know both when a radio communication occurs and from which direction, i.e., bearing, the signal came.

Several attempts have been made to address the need for a system and method capable of signal detection and bearing determination, especially for UHF and VHF signal transmissions. In general these systems and methods have adopted one of two forms.

In the first case, the system scans a single narrowband receiver/demodulator through all possible signal locations in the spectrum. When a signal is detected in the demodulator, the tuner stops scanning and records the voice channel as well as the signal intercept parameters. The detection receiver sends the intercept frequency information to a second receiver which determines the signal's bearing.

A number of shortcomings are immediately apparent with such a system. First, as there are two receivers, one for detection and one for bearing, a short signal transmission caught by the detection receiver may no longer be in transmission by the time the detection receiver provides the intercept frequency to the bearing receiver.

In addition, a single receiver scanning the spectrum may well miss short duration transmissions that occur elsewhere in the spectrum from where the scan is currently active. Further still, when stopped to record one transmission that has been found, additional transmissions that may be occurring will be missed.

In the second case, the system digitizes samples of the waveform for the entire frequency band of interest. A mathematical operation is then performed to measure all the frequencies that may contain signals. As in the first case, the detection of a signal triggers the activation of a second receiver for bearing determination.

Again, a number of shortcomings exist. As in the first case systems, bearing determination is a separate and subsequent operation performed by a second receiver. For short transmissions there is a high likelihood of the bearing determination failing as the signal transmission may well have ended. In addition, even for multiple signals, the bearing determination occurs on a one by one basis.

Recordings of the detected signal(s) are accomplished by digitally demodulating to a receiver. Power requirements for digital filtering and demodulation are quite high, and cooling of the system components is often also required in warm environments.

Reliant on large components, including the antennas, these systems (first or second case) generally require a good deal of physical real-estate and power supply capability in order to operate. Moreover, systems under the first case and the second case are not easily portable, and typically are quite expensive to install and maintain.

Hence, there is a need for a radio signal detection and bearing system and method that overcomes one or more of the issues and problems identified above.

SUMMARY

This invention provides a simultaneous radio detection and bearing system and method.

In particular, and by way of example only, according to one embodiment of the present invention, provided is a simultaneous radio detection and bearing system, an RF conditioning subsystem having a plurality of arrays of Frequency Range signal receiving channels, the RF conditioning subsystem operable to combine the signals from the arrays as a first internal data stream; a coherent multi-channel digitizer subsystem coupled to the RF conditioning system, the coherent multi-channel digitizer subsystem operable to generate a time domain snapshot of the first internal data stream; an audio recording subsystem coupled to the RF conditioning subsystem; and a processor coupled to the coherent multi-channel digitizer subsystem and the audio recording subsystem, the processor operable to transform the time domain snapshot to a frequency spectrum and identify at least one signal above a threshold at a determined frequency, determine the bearing of the signal, and provide the determined frequency of a selected identified signal to the audio recording subsystem, the audio subsystem contemporaneously recording the selected signal upon the determined frequency.

Moreover, according to yet another embodiment, of the present invention, provided is a simultaneous radio detection and bearing system, an RF conditioning subsystem having a plurality of First Frequency Range and Second Frequency Range signal receiving channels, the RF conditioning subsystem operable to combine First Frequency Range and Second Frequency Range signals as a first internal data stream; a coherent multi-channel digitizer subsystem coupled to the RF conditioning system, the coherent multi-channel digitizer subsystem operable to generate a time domain snapshot of the first internal data stream; an audio recording subsystem coupled to the RF conditioning subsystem; and a processor coupled to the coherent multi-channel digitizer subsystem and the audio recording subsystem, the processor operable to transform the time domain snapshot to a frequency spectrum and identify at least one signal above a threshold at a determined frequency, determine the bearing of the signal, and provide the determined frequency of a selected identified signal to the audio recording subsystem, the audio subsystem contemporaneously recording the selected signal upon the determined frequency.

Further, according to yet another embodiment of the present invention, provided is a simultaneous radio detection and bearing system, including: an RF receiver and block down converter subsystem operable to receive First Frequency Range and Second Frequency Range signals on at least four channels and provide a combined intermediate analog frequency signal; a coherent multi-channel digitizer subsystem coupled to the receiver and block down converter subsystem, the coherent multi-channel digitizer subsystem operable to receive the combined intermediate analog frequency and render a time domain snapshot for the frequency domain; a processor coupled to the coherent multi-channel digitizer subsystem, the processor operable to transform the time domain snapshot to a frequency spectrum and identify at least one signal at a determined frequency and contemporaneously determine the bearing of the signal based on a comparison of signal phase established by the coherent multi-channel digitizer; and an audio recording subsystem coupled to the receiver and block down converter subsystem and the processor, the audio subsystem operable to demodulate and record an audio signal from the analog intermediate frequency signal on the determined frequency provided by the processor.

In yet another embodiment provided is a method of simultaneous radio detection and bearing, including: providing an RF receiver and conditioning subsystem having at least four First Frequency Range channels and Second Frequency Range channels; sampling the First Frequency Range and Second Frequency Range spectrum each in a predetermined range; converting the samples into a first internal data stream; Simultaneously providing the internal signal to a digitizer subsystem and an audio recording subsystem; digitizing the internal signal at predetermined intervals to provide a time domain snapshot; transforming the time domain snapshot with a FFT to provide a frequency spectrum; and comparing the frequency spectrum to a threshold to identify keyed signals; in response to at least one identified keyed signal, determining the frequency of the signal and the bearing of the signal about simultaneously, and for a selected identified signal, engaging the audio subsystem to demodulate the internal signal at the determined frequency and record the selected identified signal, the recording of the signal being and the determination of bearing being about contemporaneously; and outputting the identified signal frequency, bearing and selected signal recording.

DETAILED DESCRIPTION

Before proceeding with the detailed description, it is to be appreciated that the present teaching is by way of example only, not by limitation. The concepts herein are not limited to use or application with a specific method of simultaneous radio detection and bearing determination. Thus, although the instrumentalities described herein are for the convenience of explanation, shown and described with respect to exemplary embodiments, it will be appreciated that the principles herein may be applied equally in other types of methods involving the detection of radio signal(s) and determination of bearing(s).

Figure 1:
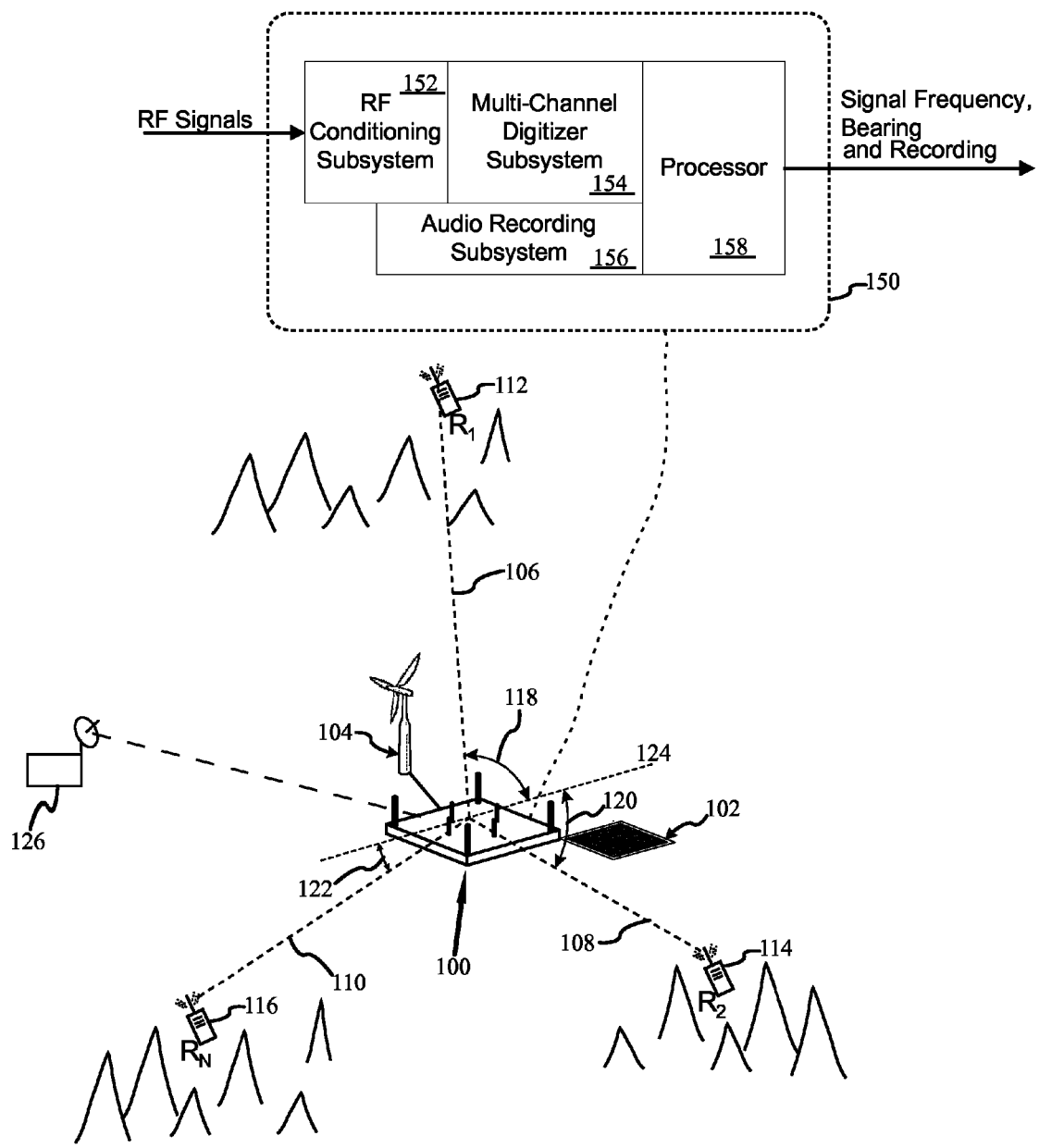
FIG. 1 illustrates a high level overview of a simultaneous radio detection and bearing system in accordance with at least one embodiment.

FIG. 1 illustrates an exemplary simultaneous radio detection and bearing system ("SRDBS") 100. As illustrated the SRDBS 100 is deployed in an area and without the requirement of an established infrastructure, such as for example, but not limited to a foundation, power grid, support staff, etc. . . . In at least one embodiment, SRDBS 100 is operable at low power and as such may be remotely operated by an independent and sustainable power source, such as but not limited to solar energy, wind energy, fuel cell and combinations thereof.

In at least one embodiment the sustainable power source is a solar array 102. In at least one alternative embodiment the sustainable power source is wind turbine 104. Moreover, SRDBS 100 is operable in locations removed from traditional power sources such as power grids, and/or may be powered in such a manner so as to not be detectible as a consuming appliance connected to a power grid.

As shown, SRDBS 100 is operable to detect multiple different radio signals, indicated by dotted lines 106, 108 and 110 concurrently emanating from radio R1 (112), radio R2 (114) and radio Rn (116) and for each detected radio signal, to simultaneously determine the frequency of the signal and the bearing of the radio signal. Based on a system of prioritization, such as for example signal strength and/or priority frequency, SRDBS 100 will also record as many detected signals as possible.

Indeed as shown, radio 112 is physically in a very different location from radio 114. Additional radios, e.g. radio 116, may be in yet different physical locations, close to or even co-located with radio 112 or radio 114. Further still, radio 112 may well be a UHF radio whereas radio 114 is a VHF radio. Regardless, SRDBS is operable to simultaneously detect all transmissions from radios R1~Rn (112, 114, 116). Moreover, it is important to understand that it is not merely the simultaneous detection of the signals that is advantageously permitted by SRDBS 100, but also the simultaneous determination of bearing and recording for each selected detected signal.

In addition to the detection of radio signals, SRDBS 100 also determines bearing to each signal, e.g. bearings 118, 120 and 122 relative to at least one known reference axis 124 of SRDBS 100. Advantageously, the determination of bearing occurs contemporaneously with the identification of the detected signals. In addition, for each detected radio signal, SRDBS 100 will capture and record the detected signal.

As used herein, the terms "contemporaneously" and "simultaneously" are understood and appreciated to be actions or activities that occur in real time at about the same instant with respect to a human perspective. Moreover, it is understood and appreciated that differences in transmission line length, processor operation sequencing and or other factors may introduce small differences in temporal occurrence such that the events are more properly described as "near real time." Accordingly, contemporaneously and simultaneously are understood and appreciated to encompass events that are both real time as well as near real time.

To clarify some general terms, as used herein, signals are understood and appreciated to be transmissions within a spectrum. A spectrum is understood as a range of frequencies. A channel is the end-to-end configuration of an antenna to digitizer or audio subsystem provided to receive signals within a spectrum.

Shown within the dotted section 150 is a conceptual block diagram of SRDBS 100 in accordance with at least one embodiment. As shown, SRDBS 100 is comprised generally of a RF conditioning subsystem 152, a multi-channel digitizer subsystem 154, an audio recording subsystem 156 and a processor 158. More specifically, RF signals are received by the RF conditioning subsystem 152 and provided simultaneously to the multi-channel digitizer subsystem 154 and the audio recording subsystem 156, each in respective communication and control with the processor 158. Though each component has been illustrated for simplicity as a single unit, it is understood and appreciated that each subsystem may well include multiple internal systems/subsystems. Further, in varying embodiments the multi-channel digitizer subsystem 154 may include a processor as well.

As discussed below, in at least one embodiment the processor 158 is provided in the form of a general computer such as a laptop. In at least one embodiment, by the execution of computer program instructions directing the operation of the processor, SRDBS 100 simultaneously detects one or more radio signals, and for each detected radio signal determines the bearing and captures an audio recording of the detected signal.

In at least one embodiment, each detected signal, 106, 108, 110, its respective bearing, 118, 120, 122, and recording is provided to a user who is present with SRDBS 100. In at least one other embodiment, each detected signal, 106, 108 110, its respective bearing, 118, 120, 122, and recording is transmitted to a user at an operation base 126. In varying alternative embodiments, SRDBS 100 may also warehouse the information locally or only locally warehouse the information for later retrieval, and therefore remain substantially stealth in operation.

Figure 2:
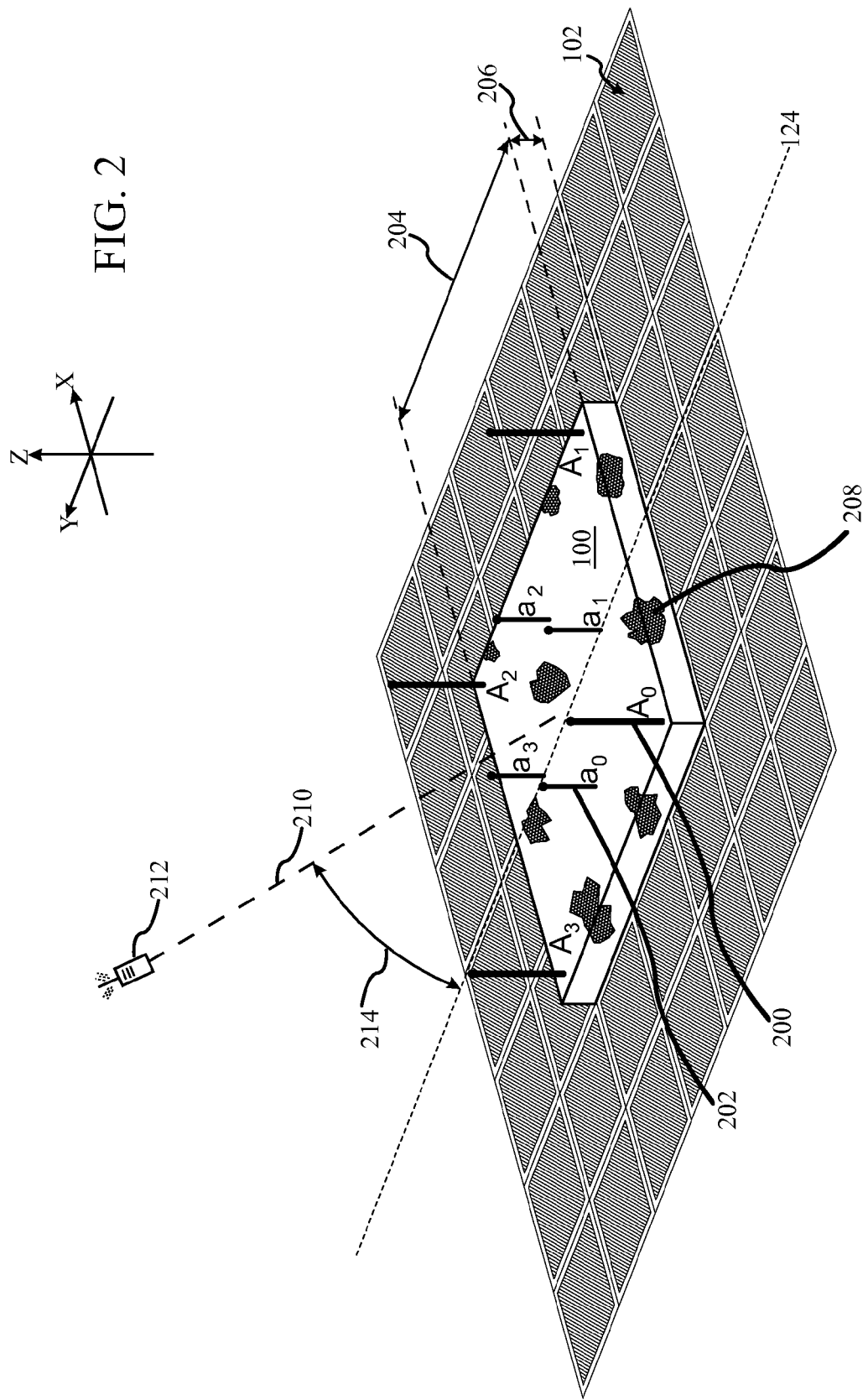
FIG. 2 is a perspective view of a simultaneous radio detection and bearing system in accordance with at least one embodiment.

FIG. 2 is an enlarged perspective view of SRDBS 100. As shown, SRDBS 100 has a plurality of arrays of Frequency Range signal receiving channels. More specifically, as shown, in at least one embodiment SRDBS 100 has two sets of antenna arrays: First Frequency Range array 200 are the outer four antennas, $A_0, A_1, A_2$ and $A_3$ and Second Frequency Range array 202 are the inner four antennas $a_0, a_1, a_2$ and $a_3$. The antenna arrays are arranged as concentric squares, and as shown for at least one embodiment, the inner arrangement of Second Frequency Range array 202 is forty five degrees off rotation from the outer arrangement of First Frequency Range array 200. With respect to the above definition of "channel" it is therefore clear that SRDBS 100 has a plurality of First Frequency Range and Second Frequency Range channels, and more specifically for the embodiment shown in FIG. 2, four First Frequency Range and four Second Frequency Range channels. As is further discussed below, the configuration as an array permits the detection of phase.

In at least one embodiment, the First Frequency Range is the VHF range and the Second Frequency Range is the UHF frequency range. In at least one alternative embodiment, the First Frequency Range is the LF and/or MF range. Further still in yet another embodiment the Second Frequency Range is the SHF and/or EHF range. Moreover, in varying embodiments the First Frequency Range and the Second Frequency Range are different and each is selected from the group consisting of LF, MF, HF, VHF, UHF, SHF, EHF and combinations thereof. Still further, although SRDVS 100 is shown and described with respect to figures as having two sets of arrays, in varying alternative embodiments SRDBS 100 may have at least one additional array of Third Frequency Range signal receiving channels.

For ease of illustration and discussion, the examples herein described and depicted relate to detection of UHF and VHF signals as may be commonly provided by hand held radios, however it is understood and appreciated that the descriptions, system and methodologies are equally applicable to embodiments of SRDBS 100 configured for detection of other frequency ranges and a plurality of different frequency ranges potentially including but not limited to UHF and VHF. Moreover, in at least one embodiment the First Frequency Range is VHF and the Second Frequency Range is UHF.

In at least one embodiment SRDBS 100 is substantially square, having a side dimension 204 of about twenty inches (20"), and a height dimension 206 of about five inches (5"). The VHF antennas are about six inches (6") tall and the UHF antennas are about four inches (4") tall. Moreover, RDVS 100 is relatively small, as compared to other devices incorporating typical VHF antennas of about forty two inches (42"), and UHF antennas of thirteen inches (13"). Further, in at least on embodiment, SRDBS 100 incorporates visual camouflage as suggested by patch 208.

SRDBS 100 is operable to detect a plurality of substantially concurrent radio transmissions, of which transmission 210 from radio 212 is exemplary. Further still, having at least one pre-established reference axis 124 SRDBS 100 is operable to determine the bearing 214 of each detected transmission 210 simultaneously with respect to the reference axis.

In at least one embodiment, SRDBS 100 further includes an optional GPS and electronic compass subsystem so as to accurately and independently determine the pre-established SRDBS position and reference axis 124. In varying embodiments, SRDBS 100 may also be deployed upon a vehicle, such as but not limited to a car, truck, train, boat, or aircraft. Moreover, SRDBS 100 is generally a portable device requiring little or no area preparation prior to installation, and easily deployed by one or a few personnel. Indeed, in at least one embodiment, SRDBS 100 is human portable. As compared to a traditional ground or ship based installation for radio detection, embodiments of SRDBS 100 may be considered as disposable, having minimal infrastructure and/or production costs.

Figure 3:
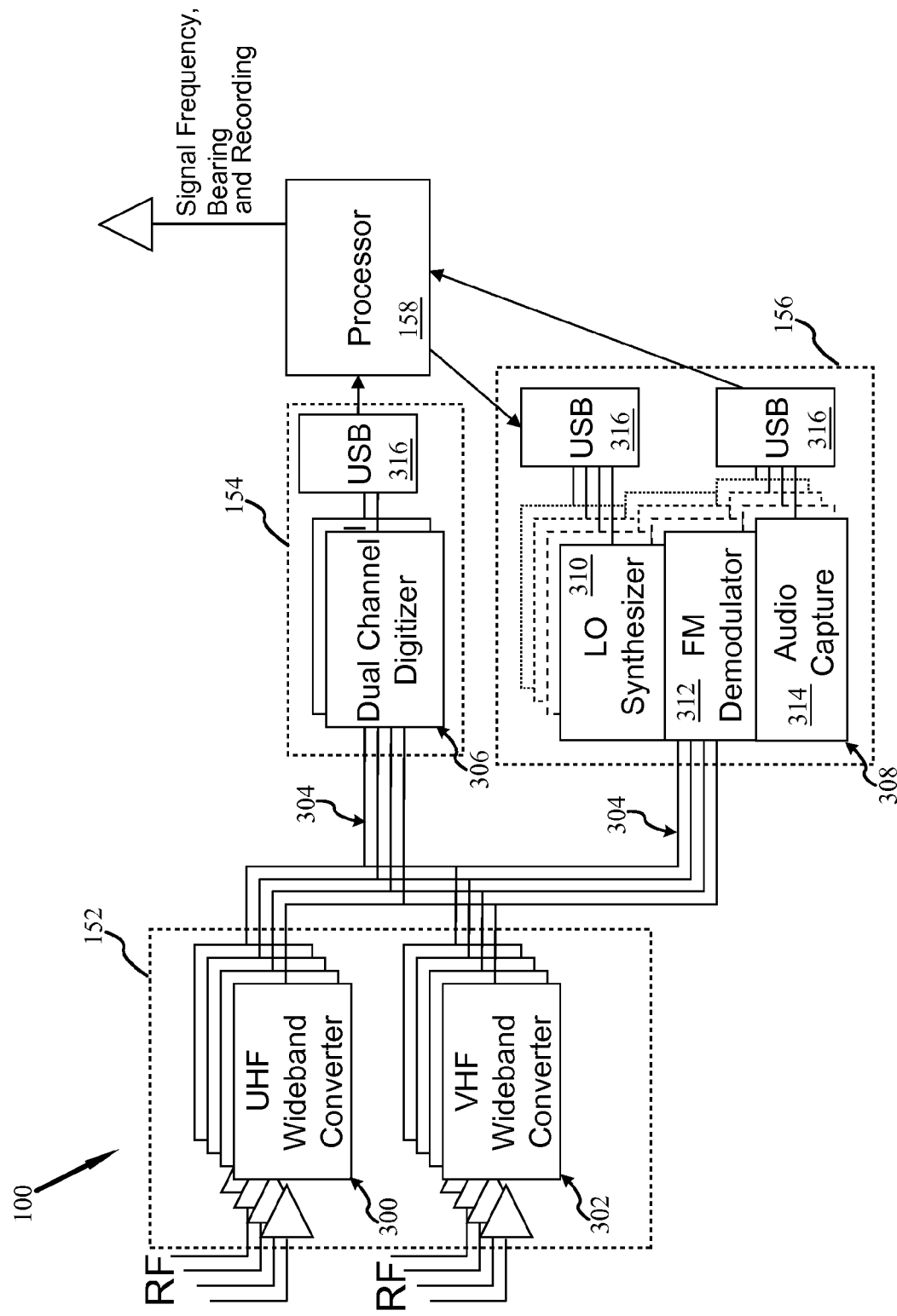
FIG. 3 is a general block diagram of the components providing the simultaneous radio detection and bearing system in accordance with at least one embodiment.

FIG. 3 conceptually illustrates the general arrangement and interconnection of SRDBS 100 components. More specifically the RF conditioning subsystem 152 has a plurality of UHF and VHF channels, of which UHF channel 300 and VFH channel 302 are exemplary. In at least one embodiment, there are four UHF channels 300 and four VHF channels 302.

The RF conditioning subsystem 152 is operable to combine the UHF and VHF spectrums as a first internal data stream 304 ($A_0a_0, A_1a_1, A_2a_2, A_3a_3$). In varying embodiments the first internal data 304 may be an analog intermediate frequency or a digital signal. As such, as used herein the terms "data stream" are understood and appreciated to apply to information that is transferred internally, regardless of whether it is as an analog signal or digital signal or other form of transmission.

Moreover, in at least one embodiment, each channel of the RF conditioning subsystem 152 is a digital receiver and filter, the first internal data stream 304 therefore being a digital signal. In at least one alternative embodiment, each channel of the RF conditioning subsystem 152 is an analog receiver and block down converter, the first internal data stream 304 being an analog intermediate frequency signal.

Each first internal data stream 304 is contemporaneously provided to the multi-channel digitizer subsystem 154 and the audio recording subsystem 156. Indeed, as each first internal data stream 304 is simply divided, in at least one embodiment the delivery of the first internal data stream 154 to the multi-channel digitizer subsystem 154 and the audio recording subsystem 156 is simultaneous.

Indeed, because the same first internal data stream 304 is provided to the multi-channel digitizer 154 and the audio recording subsystem 156, the same information used to identify a transmitted signal is also used to record that transmitted signal. This is accomplished without the use of an additional receiver. It is understood and appreciated that due to the operations performed to detect a signal and determine it's frequency, an element of delay does exist between the determination and engagement of the audio recording subsystem 156. However for practical purposes this delay is so small as to be insignificant for real world purposes. Moreover in at least one embodiment, SRDBS 100 is operable to sample the spectrum with sufficient speed so that detection, frequency measurement, and command of the audio recording subsystem 156 to start signal capture all occur within a time frame of less than about 0.1 second. This is substantially near-real-time as discussed above and is therefore for at least one embodiment considered to be a simultaneous action. As such, for at least one embodiment, the loss of any part of the transmission is generally accepted to be insignificant to the interpretation of the recorded signal. In at least one alternative embodiment, a buffer is employed to delay the signal as provided to the audio recording subsystem 147 with a signal appropriately delayed so as to account for the operations for detection and determination.

The multi-channel digitizer subsystem 154 is a coherent multi-channel digitizer. In at least one embodiment four digitizers are made coherent by using a common reference sampling clock, and collectively provide coherent multi-channel digitizer 154. For conservation of space, power and other resources, in at least one embodiment the coherent multi-channel digitizer 154 is provided by two coherent dual channel digitizers, of which coherent dual channel digitizer 306 is exemplary. Moreover, each of the digitizers 306 is connected to a single reference oscillator so as to yield coherent output data streams. Each of the four internal data streams 304 is coupled to one of the four digitizers, e.g., two internal data streams 304 to each dual channel digitizer 306.

The multi-channel digitizer subsystem 154 is operable to receive the first internal data stream 304 from the RF conditioning subsystem 152 and generate a time domain snapshot of the first internal data stream 304. The time domain snapshot is provided to the processor 158. Advantageously, in providing the time domain snapshot, the phase of each channel is retained from the first internal data stream 304 by the coherency of the dual channel digitizers 306. More specifically, as is further set forth below, because the down converters of the UHF channels 300 and VHF channels 302 use a common clock, the relative phase is preserved between channels at each frequency output of the Fourier Transform performed to transform the time domain snapshots into a frequency spectrum.

The processor 158 is operable to transform the time domain snapshot provided by the multi-channel digitizer subsystem 154 into a frequency spectrum. In at least one embodiment this transformation is performed by applying a Fast Fourier Transform (FFT) to the time domain snapshot. In at least one embodiment the FFT is provided as a fast computation of the Discrete Fourier Transform (DFT) implemented by the processor, or general computer providing the processer as discussed below. In at least one alternative embodiment the FFT is provided by a hardware Digital Signal Processor (DSP) specifically optimized for the SRDBS 100. More specifically, in at least one embodiment the DSP is incorporated as part of the multi-channel digitizer subsystem 154, such that the muti-channel digitizer subsystem 154 receives the first internal data stream 304 from the RF conditioning subsystem 152, generates a time domain snapshot and transforms the snapshot into a frequency spectrum.

It is understood and appreciated that signal transmissions may take a variety of forms, such as for example voice transmission via push to talk radios, pulse transmissions and burst transmissions. Whereas a voice transmission is generally of a relatively long duration—tens of seconds or more, pulse and burst are characterized by short durations, pulse and burst transmissions being generally any transmission that combines a very high data signaling rate with a very short transmission time.

In at least one embodiment where SRDBS 100 is to be deployed for the detection of hand radios, the use of a sample rate that is faster than the statistical key time (e.g. the talk time) alleviates the need for some embodiments of SRDBS 100 to utilize buffers so as to process all of the data provided by the first internal data stream 304. For at least one such embodiment, a sample of about a tenth of a millisecond per time domain snapshot has been found sufficient to identify hand radio signals and cue the audio recording subsystem 156. Partial sampling also advantageously permits lower power consumption by the processor or DSP as well as reducing cooling requirements.

In alternative embodiments, such as where pulse transmissions, burst transmissions, and/or other short duration transmissions are desired targets for detection, various embodiments of SRDBS 100 employ ping pong buffers, e.g. double buffers. While one buffer is being processed, the other buffer is being loaded—switching between the two permits all data to be processed without loss or data pileup. In general, the use of ping pong buffers increases the system complexity of SRDBS 100 and power consumption as more data processing and manipulation is being performed. As such, unless the end use so requires, embodiments of SRBDS 100 may be simplified by using a partial sampling of each time domain snapshot as described with respect to hand radio transmissions.

As is further discussed below a threshold, such as an amplitude threshold, is applied to the frequency spectrum such that signals that breach the threshold are taken as identified signal transmissions. For each identified signal, the frequency is determined, the bearing is calculated and, for at least a subset of the detected signals, the frequency of a selected number of the detected signals is provided to the audio recording subsystem 156.

In at least one embodiment, the audio recording subsystem 156 includes a plurality of FM radios, of which radio 308 is exemplary. Each radio 308 has a local oscillator 310, FM demodulator 312 and an audio recorder 314. Although there is a one-to-one relationship between each RF conditioning subsystem 154, each first internal data stream 304 and each digitizer, SRDBS 100 provides a plurality of radios 308. Moreover, as discussed above there are four channels, operable to detect N concurrent signals simultaneously.

To effectively record each and every of the N detected signals, SRDBS 100 would ideally provide N radios 308. However, in at least one embodiment SRDBS 100 provides less than N possible radios 308, e.g. SRDBS 100 provides M radios 308 where M is less than a maximum N. Clearly, in many situations M radios will be sufficient as the detected number of signals N may well be less than M. Where N is indeed greater than M, a prioritization scheme is employed to select detected signals for recording.

Of the detected signals, a selected number are recorded. Initially the number of simultaneous recordings is at least that of the number of radios 308 provided. When the number of detected signals is greater than the number of radios 308 provided, at least one selection process is applied, such as for example the selection of detected signals having the greatest transmission power, correlation to a priory frequency and/or combinations thereof as well as other methodologies.

When a frequency is provided by the processor 158 to an FM radio 308, the local oscillator 308 tunes to the specified frequency and the first internal data stream 304 is demodulated to the detected signal. As shown, in at least one embodiment the interconnections between the multi-channel digitizer 154, the processor 158 and the audio recording subsystem 156 is accomplished with USB interface protocols 316.

As shown and described, in at least one embodiment there are at least four internal data streams 304, one from each set of channels. In at least one embodiment, a single channel is selected and hardwired to the audio recording subsystem 156. Such an embodiment simplifies design and fabrication. An appropriate number of splitters and/or amplifiers are utilized to distribute the single hardwired channel to each of the radios provided 308.

In at least one alternative embodiment, the plurality of internal data streams 304 are combined so as to provide fault tolerance and improve signal to noise ratios. Moreover, in at least one embodiment an optimally weighted sum of all four channels is employed and provided to the audio recording subsystem 156.

As the detection process as performed by SRDBS 100 is a continuously repeating process, in at least one embodiment the repeating cycles are used to cue when a recording should end. More specifically if a signal is not detected in a consecutive number of snapshots, the audio recording subsystem 156 will be disengaged for that previously identified signal. Specifically, in at least one embodiment the number of consecutive snapshots with an absent signal to trigger the end of a recording is three (3).

Similarly, in at least one embodiment a recording is cued to end if the signal has continued beyond a user defined duration. Moreover, as indicated above various embodiments of SRDBS 100 may have a varying number M of radios 308, however it is understood and appreciated that the number of detected signals N may in some cases be greater than the number of available radios M. Various different prioritization schemes may be employed for different configurations, such as, but not limited to: predetermined frequencies of priority, signal power, bearing, and other factors as may be desired by an end user of SRDBS 100.

As the audio recording subsystem 156 receives the same first internal data stream 304 as is provided to the multi-channel digitizer subsystem 154, the audio recorder 314 then records the transmission in about real time in an appropriate format, such as for example, *.wav, * mp3, *.vox, *.ra, or other free or proprietary audio file format. In at least one alternative embodiment, the signal is recorded in a pre-detected (un-demodulated) format (such as the intermediate frequency or digital signal comprising the first internal data stream 304).

Figure 4:
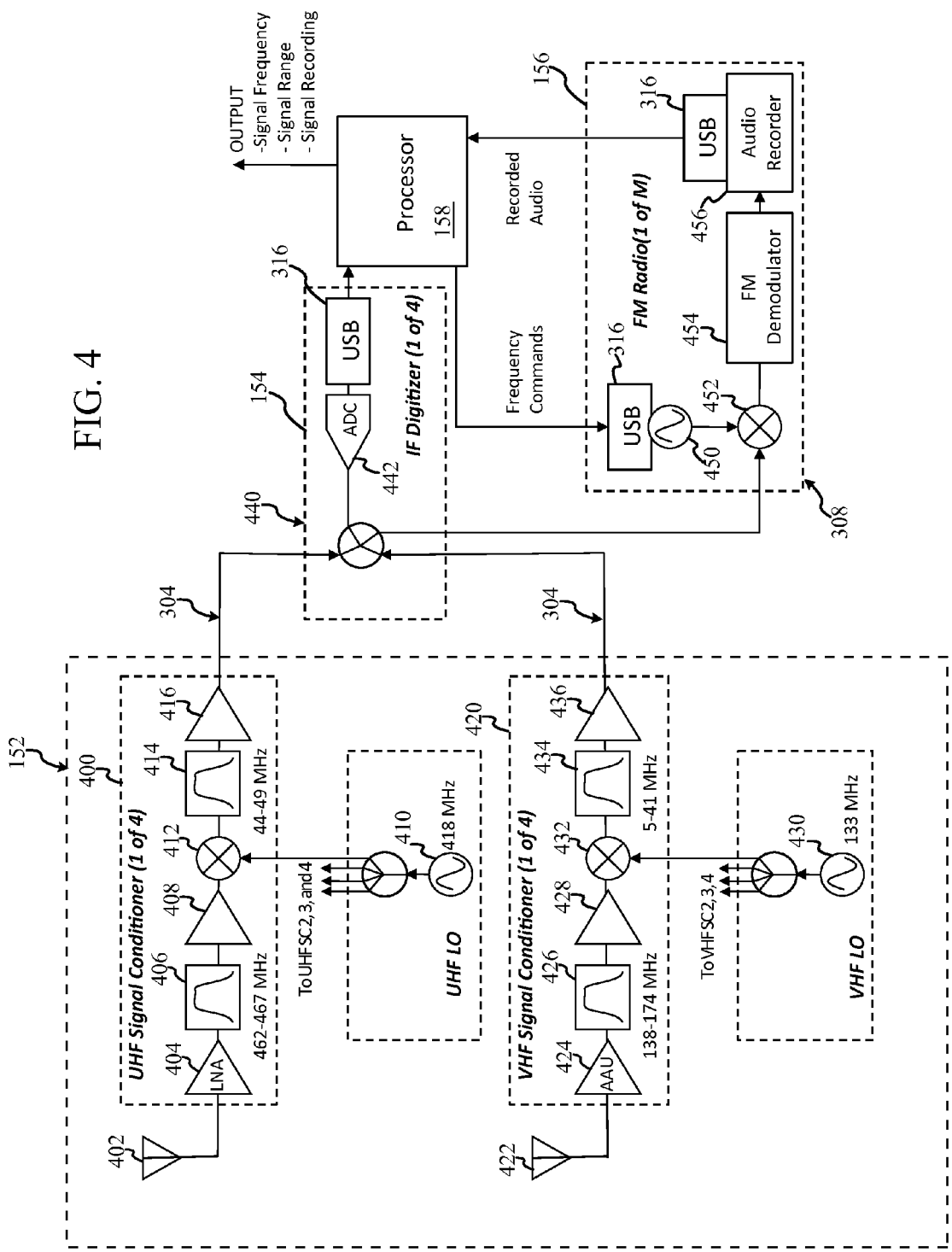
FIG. 4 is a refined block diagram of the components providing the simultaneous radio detection and bearing system in accordance with at least one embodiment.

Moreover, with respect to SRDBS 100 as conceptually shown in FIG. 3, it is understood and appreciated that because the same first internal data stream 304 is being provided to both the multi-channel digitizer subsystem 154 and the audio recording subsystem 156, the same information being used to identify the transmitted signal is used to record the transmitted signal. Moreover a second receiver is not required to tune to the identified frequency with the hope of finding and then recording the transmitted signal. Use of the same first internal data stream 304 for both operations advantageously minimizes the chance of missing the recording of an identified signal FIG. 4 is a more refined system block diagram of SRDBS 100 further illustrating for at least one embodiment, the components of the RF conditioner subsystem 152, the multi-channel digitizer subsystem 154, the audio recording subsystem 156 and processor 158.

More specifically, within RF conditioner subsystem 152, for at least one embodiment there are four UHF signal conditioners, of which UHF signal conditioner 400 is exemplary. An antenna 402 is coupled to a low noise amplifier 404 which in turn is coupled to a filter 406 set for the frequency range of about 462 MHz~467 MHz. The output from filter 406 is directed through pre-amplifier 408.

So as to provide a first internal data stream 304 as an intermediate frequency, a heterodyne process is applied. Stated generally, a first local oscillator 410 set to about 418 MHz provides a predetermined signal to each UHF signal conditioner. Moreover, in at least one embodiment first oscillator 410 is a 418 MHz crystal oscillator. In at least one embodiment the same first oscillator 410 is used to provide the same predetermined signal to each of the respective UHF signal conditioners.

With respect to UHF signal conditioner 400, this predetermined signal is provided to mixer 412 where it is combined with the output from pre-amplifier 408. As the heterodyne process provides two new frequencies the output from mixer 412 is directed through band pass filter 414 set for the frequency range of about 44 Mhz~49 MHz so as to provide only the desired spectrum, and then subsequently passed to intermediate frequency amplifier 416.

The VHF array is composed of active antennas 422. The use of the active antenna unit in at least one embodiment is highly advantageous for many reasons. The use of active antennas 422 permits antenna height of about six inches (6"). There is also no transmission line as is typical with a normal VHF antenna. The active antenna unit 424 is specifically pre-designed to have an input matched to about the same impedance of the active antenna 422, thereby insuring that the active antenna unit 424 receives a substantial fraction of the antenna energy.

Similarly, within RF conditioner subsystem 152, for at least one embodiment there are four VHF signal conditioners, of which VHF signal conditioner 420 is exemplary. An antenna 422 is coupled to an active antenna unit 424 which in turn is coupled to a filter 426 set for the frequency range of about 138 MHz~174 MHz so as to provide only the desired spectrum. The output from filter 426 is directed through pre-amplifier 428.

A second local oscillator 430 set to about 133 MHz provides a predetermined signal to each VHF signal conditioner. Moreover, in at least one embodiment second oscillator 430 is a 133 MHz crystal oscillator. In addition, in at least one embodiment the same second oscillator 430 is used to provide the same predetermined signal to each of the respective UHF signal conditioners.

With respect to VHF signal conditioner 420, this predetermined signal is provided to mixer 432 where it is combined with the output from pre-amplifier 428. As this heterodyne process provides two new frequencies the output from mixer 432 is directed through band pass filter 434 set for the frequency bearing of about 5 Mhz~41 MHz so as to provide only the desired frequency, and then subsequently passed to intermediate frequency amplifier 436.

The first internal data stream, e.g., the intermediate frequency provided by each channel set of a UHF signal conditioner and a VHF signal conditioner is then combined and provided to one channel of the multi-channel digitizer 154, of which coherent multi channel digitizer 440 is exemplary. As noted above, the intermediate frequency is contemporaneously provided to the audio recording subsystem 156 of which FM radio 308 is exemplary.

As noted above, in at least one alternative embodiment, the RF conditioner 152 has a plurality of digital UHF receivers each paired with an appropriate digital bandpass filter and a plurality of digital VHF receivers each pared with an appropriate digital bandpass filter. The digital configuration effectively eliminates the use of a down converter within the RF conditioner 152. In at least one embodiment, this elimination provides a number of advantages to a SRDBS 100, such as but not limited to being smaller, less complex, requiring less operational power, a greater tolerance for temperature fluctuation, and combinations thereof. The output from the respective digital receivers and filters is combined as the first internal data stream 304

In varying embodiments the ADC 442 has a clock frequency in a range of about 90 MHz~1 GHz and a resolution selected within a range of about 6 to about 64 bits. In at least one embodiment, coherent multi channel digitizer 440 is an analog to digital converter (ADC) 442 receiving the intermediate frequency and converting the continuous signal to discrete digital numbers. In general, the four ADCs 442 are matched in kind and selected from the group consisting of direct conversion ADCs, successive-approximation ADCs, ramp-compare ADCs, Wilkinson ADCs, integrating ADCs, delta-encoded ADCs, pipeline ADCs, Sigma-Delta ADCs, Time-interleaved ADCs, and ADC with intermediate FM stage. Moreover, the selection of the ADCs 442 is an optimal selection based upon the combination of clock frequency and bit rate to maximize the dynamic range of the snapshot, alias error correction, and/or other factors relevant for the intended environment in which SRDBS 100 is to be used.

In data sampling systems, it is important to provide samples of enough data to effectively provide all of the necessary data for the type of desired processing and evaluation. In at least one embodiment, the signals being sampled are about 12 kHz wide and distributed across a bandwidth of about 36 VHF MHz and bandwidth of about 6 UHF MHz for a total of about 42 MHz of bandwidth of interest. For such an embodiment, a sampling rate of about 2.38 times the bandwidth of interest provides adequate sampling. Although higher sampling rates may be selected, and or appropriate for alternative embodiments, greater sampling rates typically also require greater power supply for the system.

In addition, in at least some embodiments the aliasing property of the digitizer may advantageously be exploited. More specifically, for a digitizer running at 100 MHz the SRDBS 100 will unambiguously detect frequencies from 0 to 50 HMz. If a signal comes in at 75 HMz it is not lost, but rather it maps back, i.e. aliases, as 25 HMz. Depending on end deployment and use desires such aliasing may or may not be desired, however for situations such as the detection of hand radios, this behavior once again provides advantageous power savings, design and fabrication simplicity to at least one embodiment of SRDBS 100.

In at least one embodiment, each ADC 442 has a clock frequency of 100 MHz and a resolution of 8-bits. Having a clock frequency of 100 MHz, each ADC 442 produces about 16,384 samples, e.g., snapshots, approximately four times per second. As all ADCs 442 are sampled using a common reference, the time domain snapshots provided by each are synchronized. For this specific embodiment, the sample rate of 100 MHz, combined with the snapshot width of 16,384 samples yields a frequency resolution of approximately 6.1 kHz per frequency cell as results from the FFT. This is approximately half the closest channel spacing of handheld radios used in these applications, providing a high probability of simultaneously detecting adjacent signal channels. The 8 bit digitizer, combined with the processing gain of a 16,384 sample snapshot produces a digital dynamic range of approximately 84 dB, more than adequate for spurious signal elimination in the anticipated signal environment.

With respect to FIG. 4, each FM radio 308 includes a tunable oscillator 450, such as a tunable crystal oscillator, that is responsive to a frequency provided by the processor 158. The tuned frequency signal from the oscillator 450 is provided to mixer 452 which also receives the first internal data stream 304, e.g., the intermediate frequency signal or the digital signal. Output from the mixer is provided to the demodulator 454 that extracts the audio signal from the intermediate frequency and provides the audio signal to the audio recorder 456. It is understood and appreciated that as an intermediate frequency is in use, an offset for the local oscillator may be appropriate. The specific type and/or amount of offset is of course determined by the type of signal being detected. For example, for a typical FM signal, in at least one embodiment utilizing a 455 kHz discriminator, subtracting 455,000 from the detected frequency before commanding the local oscillator frequency is appropriate. If the signal is of a single sideband modulation, an offset by either positive or negative half bandwidth is appropriate. Moreover, it is understood and appreciated by those skilled in the art that appropriate offsets commensurate with specific demodulators are applied based on the user determined types of signals that various embodiments of SRDBS 100 are intended to detect.

So as to facilitate ease of connection and low power usage throughout the SRDBS 100, in at least one embodiment, the interconnections between the processor 158, the multi-channel digitizer subsystem 154 and the audio recording subsystem 156 are USB protocols 316.

The processor 158 is operable to transform the time domain snapshot provided by the multi-channel digitizer subsystem 154 to a frequency spectrum and identify at least one signal above a threshold at a determined frequency. For each signal detected above the established threshold, the bearing of the signal is determined and the frequency is provided to the audio recording subsystem 156 so that a contemporaneous recording of the signal can be obtained.

Figure 5:
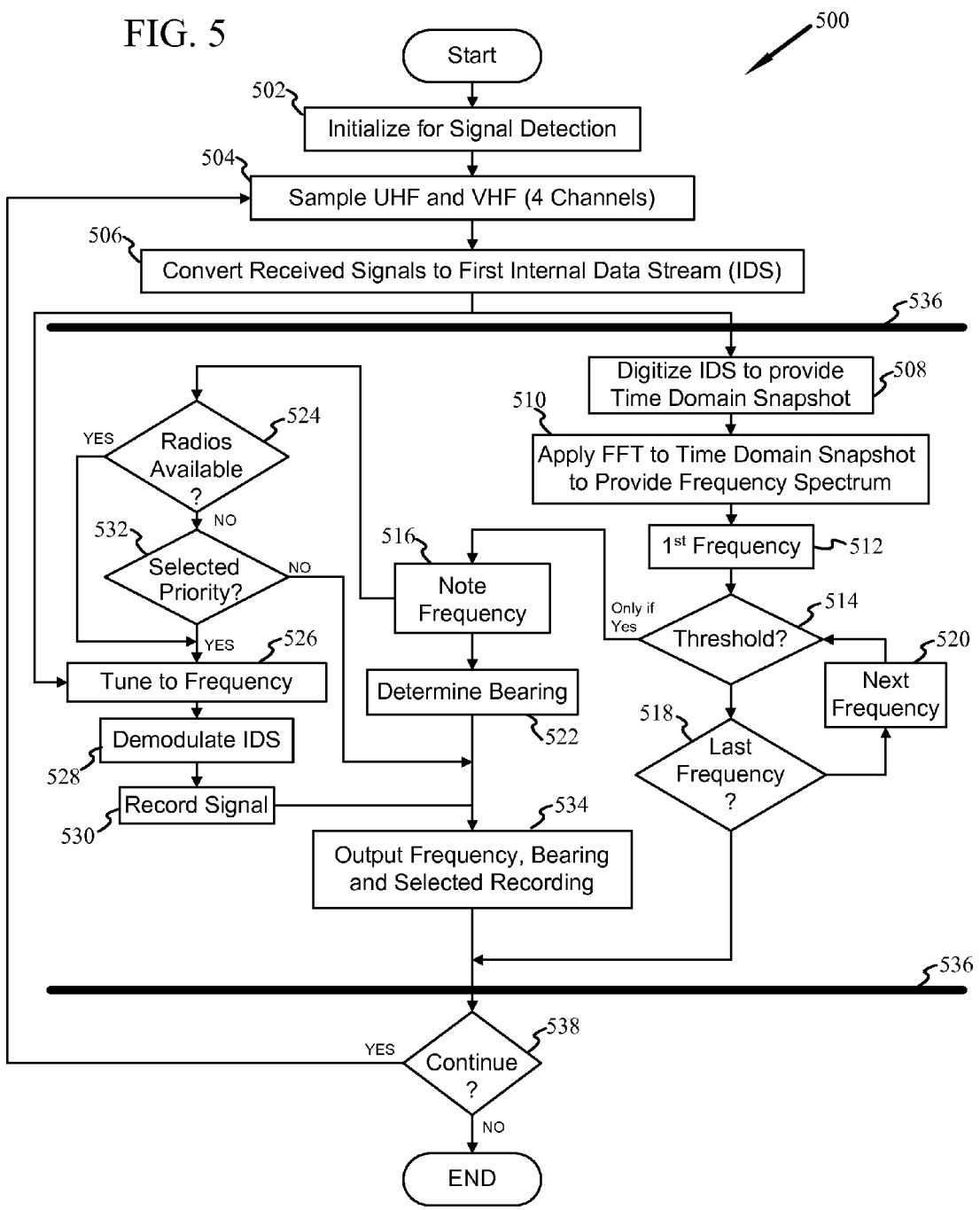
FIG. 5 is a flow diagram of a method for radio signal detection and bearing determination in accordance with at least one embodiment.
Figure 6:
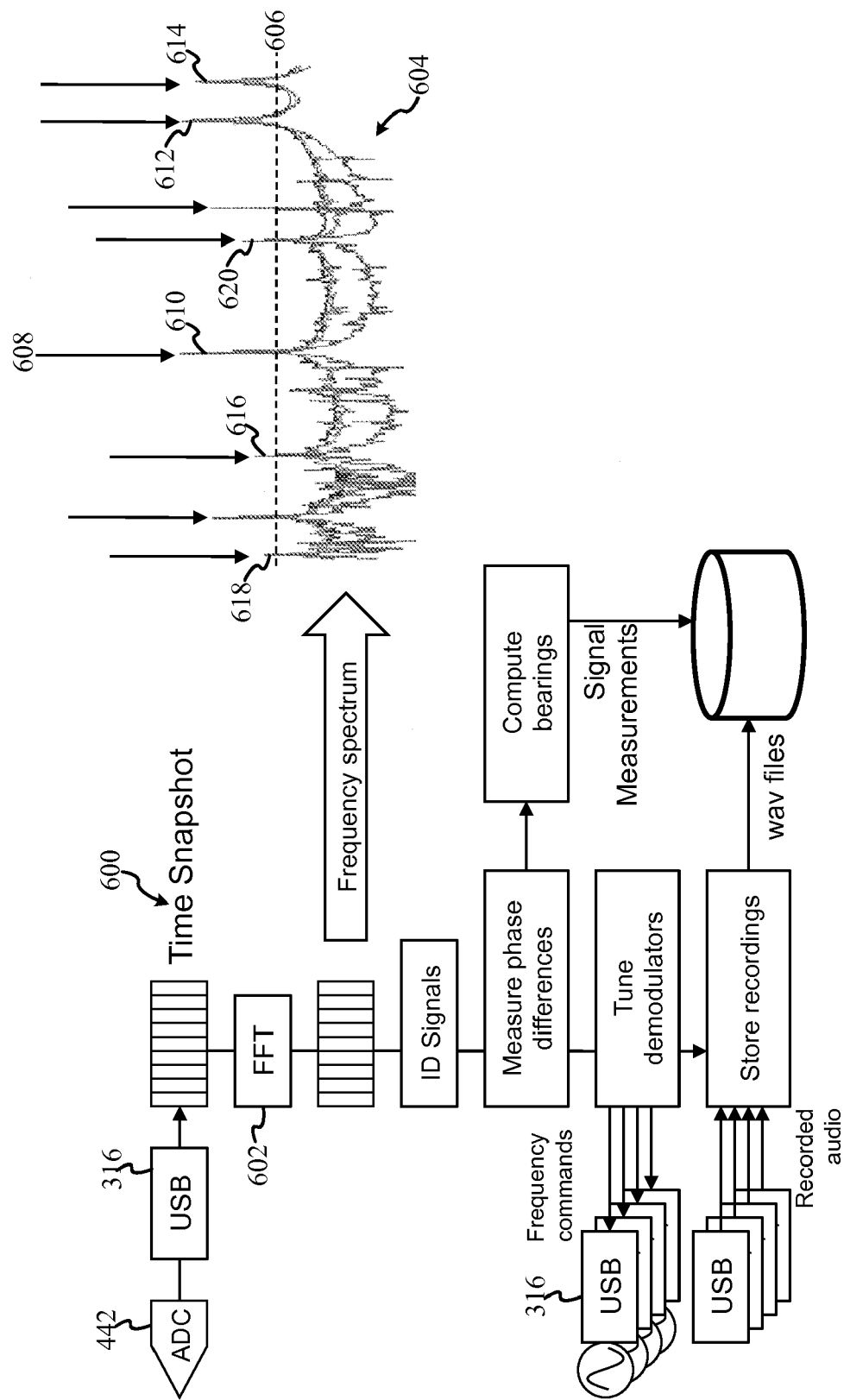
FIG. 6 is a block diagram of the processor actions in accordance with at least one embodiment.

FIGS. 5 and 6 conceptually illustrate the method 500 for detecting a radio signal and bearing. More specifically, FIG. 5 presents a high level flow diagram that in connection with FIGS. 1-3 and 5 presents a method for at least one embodiment of detecting a radio signal and bearing. It will be appreciated that the described method need not be performed in the order herein described, but that this description is merely exemplary of at least one preferred method of detecting a radio signal and bearing.

As shown in FIG. 5 the method typically commences with SRDBS 100 being initialized for signal detection, block 502. In general, initialization may include such activities as deploying SRDBS 100 in a desired area and/or powering up SRDBS 100. Once initialized, SRDBS 100 commences collecting time domain snapshots of UHF and VHF environments. As described above, in at least one embodiment SRDBS 100 advantageously utilizes four UHF channels and four VHF channels, block 504. In addition, it is understood and appreciated that SRDBS 100 is not selectively tuning through each frequency within a desired spectrum, rather SRDBS 100 is sampling an entire frequency spectrum continuously.

Received signals are then converted to a first internal data stream, block 506. In at least one embodiment this first internal data stream is an analog intermediate frequency (IF) as discussed above. In at least one alternative embodiment, this first internal data stream is a digital signal.

As in block 508, the multi-channel digitizer subsystem 154 (see FIGS. 2-4) digitizes the first internal data stream to provide a time domain snapshot 600, see FIG. 6. As in block 510, the processor is operable to receive the time domain snapshot 600 and apply a FFT 602 to provide a frequency spectrum 604. As is conceptually illustrated in FIG. 6, a threshold 606, e.g. an amplitude threshold, is defined and imposed upon the frequency spectrum 604, block 512. Signal peaks that breach the threshold 606 are taken as unknown but determined keyed signals 608 whereas those below threshold are taken as general noise.

In at least one embodiment, the threshold is adjustable, thereby permitting fine-tuning to adjust to the desired application of SRDBS 100. Moreover, in some embodiment applications it may be desirable to establish a low threshold so as to ensure a greater likelihood of identifying any signal transmissions, even though a lower threshold may include an occasional false identification of noise as a signal. In other embodiment applications it may be desirable to establish a high threshold so as to eliminate low level signals which are not of concern. In at least one embodiment the threshold is self tuned by the SRDBS 100 employing various methodologies to adaptively respond to the environment in which SRDBS 100 is deployed.

More specifically, for each frequency spectrum 604, a first frequency is determined and selected, block 512. In one embodiment this first frequency is at about the lower bound of the spectrum. In at least one other embodiment this first frequency is at about the upper bound of the spectrum. In yet another embodiment this first frequency is a pre-determined highest priority frequency.

The selected frequency is then compared to the threshold, decision 514. If the selected frequency is above the threshold—a determined keyed signal—the frequency is noted, block 516. If the last frequency in the spectrum has not been reached, decision 518, the next frequency is selected, block 520.

In the event that a keyed signal has been identified, the frequency is noted, block 516 and the bearing to the keyed signal is determined, 522. The noted frequency is provided to the audio recording subsystem 156. As there may be more detected signals then radios available to demodulate and record the signal, a check is performed to query for available radios, decision 524. If a radio is available, the frequency is provided to the available radio, which in turn tunes to the frequency, block 526. The radio then demodulates the first internal data stream, block 528, and records the signal, block 530.

In the event that no radios are available a test is performed to determined whether the noted frequency is a selected priority, decision 532. In a first example, the selection for priority is determined by signal strength, such that signals 610, 614 and 612 are classified as priorities. In a second example, pre-determined frequencies, such as signals 616, 618 and 620 are classified as priorities. In at least one embodiment, past frequency of use may also be a factor in determining priority for recording.

If the determination is yes, a lesser priority recording is preempted as a radio is directed to tune to the noted frequency, block 526. If the frequency is determined not to be a priority, no recording is made. When a selected recording is made, this recording is output with the noted frequency and determined bearing, block 534. The recording will generally continue until preempted by a higher priority signal, or until it is found to be absent in a series of consecutive time domain snapshots.

Moreover, as SRDBS 100 cycles through time domain snapshots, previously identified radio transmissions will again be re-identified. A flag system may be used to track previously identified signals, and, in at least one instance trigger a notification if the bearing of the signal changes. Further, the flag may be used to maintain the operation of the radio in the audio recording subsystem 156 for the duration of the detected signal. As noted above there are 1 to M radios and in some instances there may be more than M signals detected. By using flags with a range of priorities the audio subsystem 156 can easily be directed as to which signals to record.

In at least one embodiment this output information is transmitted to a receiving location, e.g. base 126 or a local user. In at least one alternative embodiment, this output information is written to a local storage device, such as a hard drive. If SRDBS 100 is to continue collecting time domain snapshots, decision 538, the process returns to block 504. If not, SRDBS 100 ceases collecting time domain snapshots.

As suggested by the heavy parallel lines 536, the process of determining a frequency as a keyed frequency, determining the bearing and recording the frequency if radios are available or when it is a selected priority are actions that are performed substantially simultaneously. Further, it is important to note that the detection of radio signals and bearing is a continual process. Regardless of whether a signal has been detected or not (and accordingly it's frequency noted and bearing determined) the method 500 returns to block 504.

Figure 7:
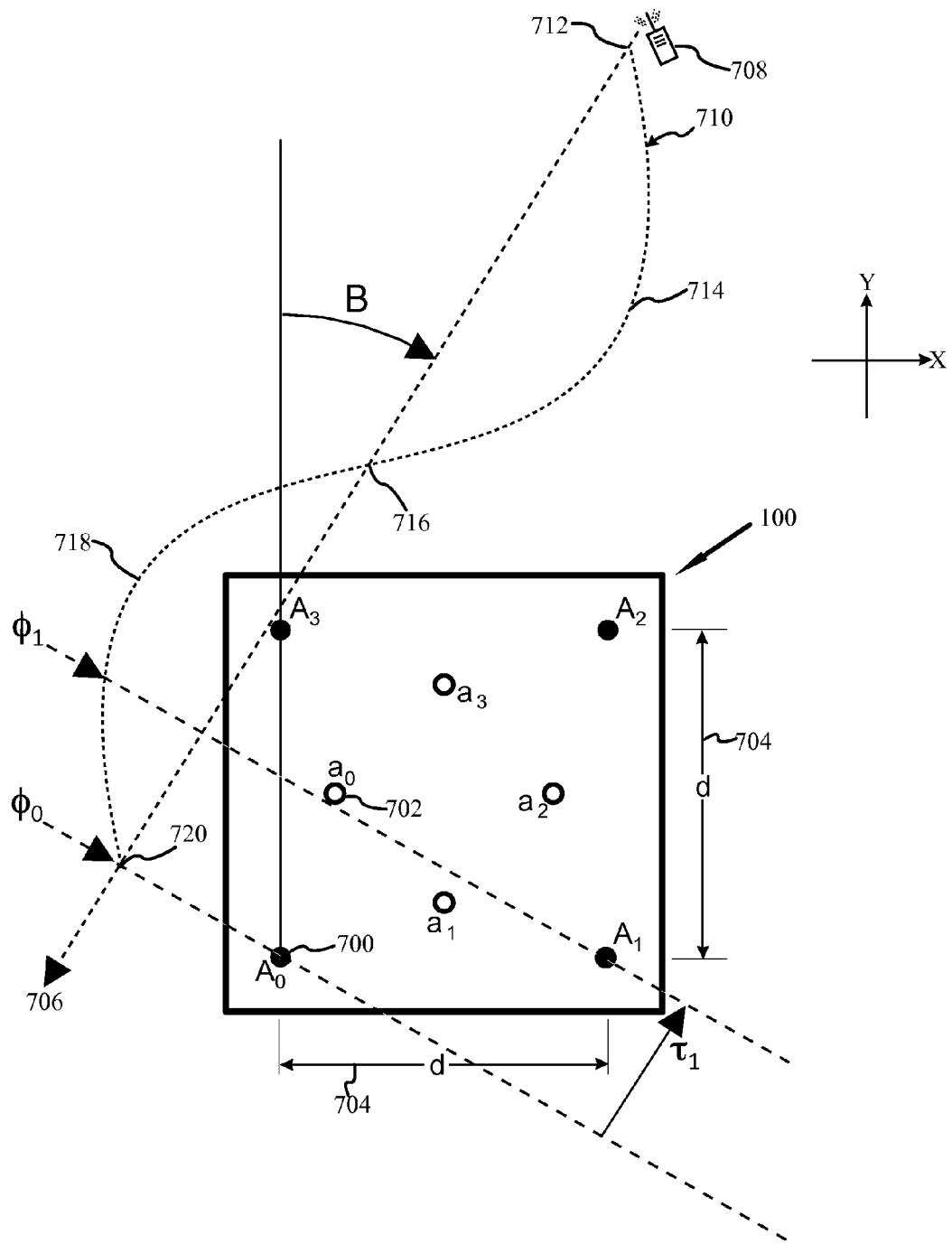
FIG. 7 illustrates an general overview of phase interferometry bearing determination in accordance with at least on embodiment.

The determination of bearing is based in at least one embodiment on phase interferometry. FIG. 7 is a top view of SRDBS 100 according to at least one embodiment, the VHF array antennas 700 are the outer four antennas, $A_0$, $A_1$, $A_2$ and $A_3$. The UHF array antennas 702 are the inner four antennas $a_0$, $a_1$, $a_2$ and $a_3$. Moreover, the antennas are arranged as concentric squares. Moreover the physics and the algorithms for processing are independent from frequency. For the purposes of this example for bearing determination the signal in question is being received by the VHF array antennas 700.

The VHF antennas 700 are spaced a distance d apart as shown by dimension indicators 704. The incoming signal 706 from the remote radio 708 that has been detected is incident to SRDBS 100 at angle B. The phase of the signal 706 a propagated wave front is illustrated by dotted line 710. In this example the cycle of the propagated wave front runs from a first zero value 712 to a Right offset 714, to a second zero value 716, to a Left offset 718 and finally a third zero value 720. The phase is the fraction of a complete cycle corresponding to an offset in the displacement from a specified reference point at time $T_0$. Moreover, at $T_0$ the phase 710 of the signal 706 as received by antenna $A_0$ is 0. As shown, at $T_1$, the phase 710 of the signal 706 as received by antenna $A_1$ is greater than zero. Therefore, there is a phase difference, $\Delta\beta$, between the two VHF antennas $A_0$ and $A_1$. The angle B can be calculated based on this $\Delta\beta$, by application of the formula indicated by Equation 1 below.

$$B = \sin^{-1}\left(\frac{\lambda \Delta \phi}{2\pi d}\right) \qquad \text{Equation 1}$$

In Equation 1, B is the bearing in radians. Lambda is the free space propagation wavelength at the frequency of interest, e.g., $\lambda = C/f$ where C is the speed of light, and f is the frequency. The distance between antennas, d, is understood to be in the same units as lambda.

Generally of course the distance d is half the wavelength or less. To account for the possibility of mutual coupling between antennas, calibration of the SRDBS 100 is performed prior to field deployment.

As is clear from the above description and the accompanying figures, there are four VHF and four UHF channels in at least one embodiment of the SRDBS 100. The determination of bearing is generally enhanced when the incidence of the signal is transverse to the baseline established by two antennas. With four antennas for UHF and four antennas for VHF, there are at least two baselines for each. As such, varying embodiments of SRDBS 100 provide for advantageously enhanced bearing determination.

Figure 8:
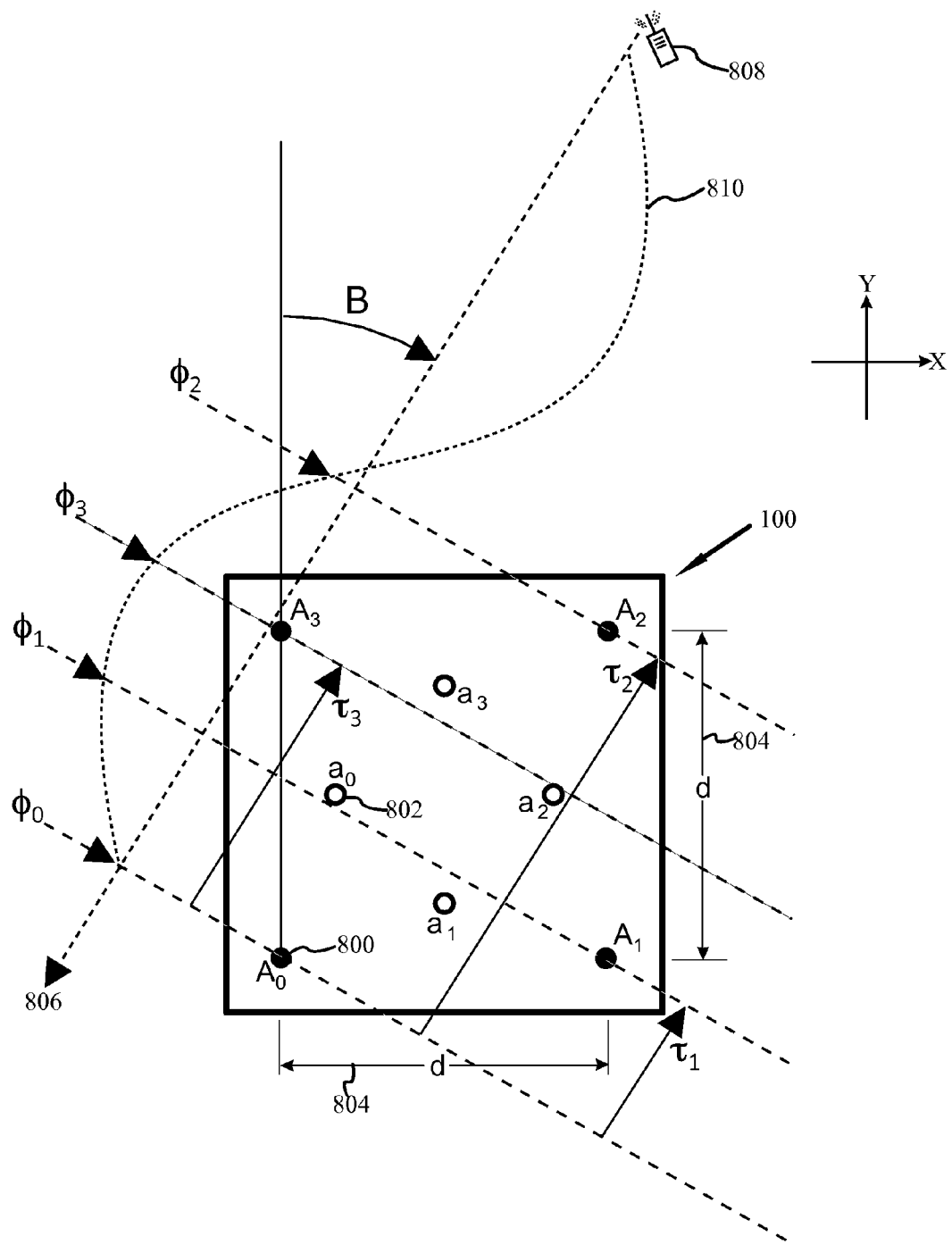
FIG. 8 illustrates an advanced overview of phase interferometry bearing determination in accordance with at least on embodiment.

FIG. 8 illustrates an enhanced bearing determination according to at least one embodiment. Moreover, as in FIG. 7, FIG. 8 is a top view of SRDBS 100 according to at least one embodiment, the VHF array antennas 800 are the outer four antennas, $A_0$, $A_1$, $A_2$ and $A_3$. The UHF array antennas 802 are the inner four antennas $a_0$, $a_1$, $a_2$ and $a_3$. Moreover, the antennas are arranged as concentric squares. For the purposes of this first example for bearing determination, the signal in question is being received by the VHF array antennas 800.

The VHF antennas 800 are spaced a distance d apart as shown by dimension indicators 804. The incoming signal 506 from the remote radio 508 that has been detected is incident to SRDBS 100 at angle B. The phase of the signal 806 is illustrated by dotted line 810, the phase being the fraction of a complete cycle corresponding to an offset in the displacement from a specified reference point at time $T_0$. Moreover, at $T_0$ the phase 810 of the signal 806 as received by antenna $A_0$ is $\Theta_0$. As shown, at $T_1$, the phase 810 of the signal 806 as received by antenna $A_1$ is greater than zero. At $T_2$, the phase 810 of the signal 860 as received by antenna $A_3$ is also greater than zero and greater than signal received by antenna $A_1$. At $T_3$, the phase 810 of the signal 806 as received by antenna $A_2$ is greater than zero, but also less than that received by antennas $A_1$ or $A_3$.

Indeed in the present example of FIG. 6 there are three different phases $\Phi_1$, $\Phi_2$ and $\Phi_3$ as received by the different antennas $A_1$, $A_2$ and $A_3$ in comparison to $\Phi_0$ as received by antenna $A_0$. With the use of four antennas, the likelihood of some mutual coupling may increase. However, this is advantageously offset by pre-deployment calibration of SRDBS 100. It is understood and appreciated that the choice of which antenna should be antenna $A_0$ and which antennas are therefore antennas $A_1$, $A_2$ and $A_3$ is inconsequential. Regardless of how the array is identified, the determined bearing will be the same. It is important to note however that for low amplitude signals, many if not all of the phases may be relatively poor. So as to advantageously resolve this as well as improve overall identification and performance SRDBS 100 is calibrated before being deployed in real world environment.

In calibrating SRDBS 100, a signal is sent from all known bearing (e.g., 360 degrees) and the relative phases $\theta_1$, $\theta_2$, and $\theta_3$ are measured and recorded. An unknown signal produces relative phases $\Phi_1$, $\Phi_2$ and $\Phi_3$. To find the bearing of an unknown signal, it is basically an iterative process to find the calibration set $\{\theta_1, \theta_2, \text{ and } \theta_3\}$ that best "matches" the unknown signal $\{\Phi_1, \Phi_2 \text{ and } \Phi_3\}$. Due to signal noise and system errors it is highly unlikely that a perfect match will be found. This is understood and therefore a solution is defined to be the best match function G, shown as Equation 2

$$G = \cos(\theta_1)\cos(\phi_1) + \sin(\theta_1)\sin(\phi_1) + \cos(\theta_2)\cos(\phi_2) + \sin(\theta_2)\sin(\phi_2) + \cos(\theta_3)\cos(\phi_3) + \sin(\theta_3)\sin(\phi_3) \qquad \text{Equation 2}$$

Moreover the process measures the phase $\{\Phi_1, \Phi_2 \text{ and } \Phi_3\}$ for each unknown signal and then searches through all possible calibration B's and their associated phase sets $\{\theta_1, \theta_2, \text{ and } \theta_3\}$, computing G for each one. In the case of an exact match wherein each F perfectly matches each $\theta$, G will be three (3). The highest G indicates the best guess at the unknown signal's bearing. Classically this is known as a Maximum Likelihood solution.

Figure 9:
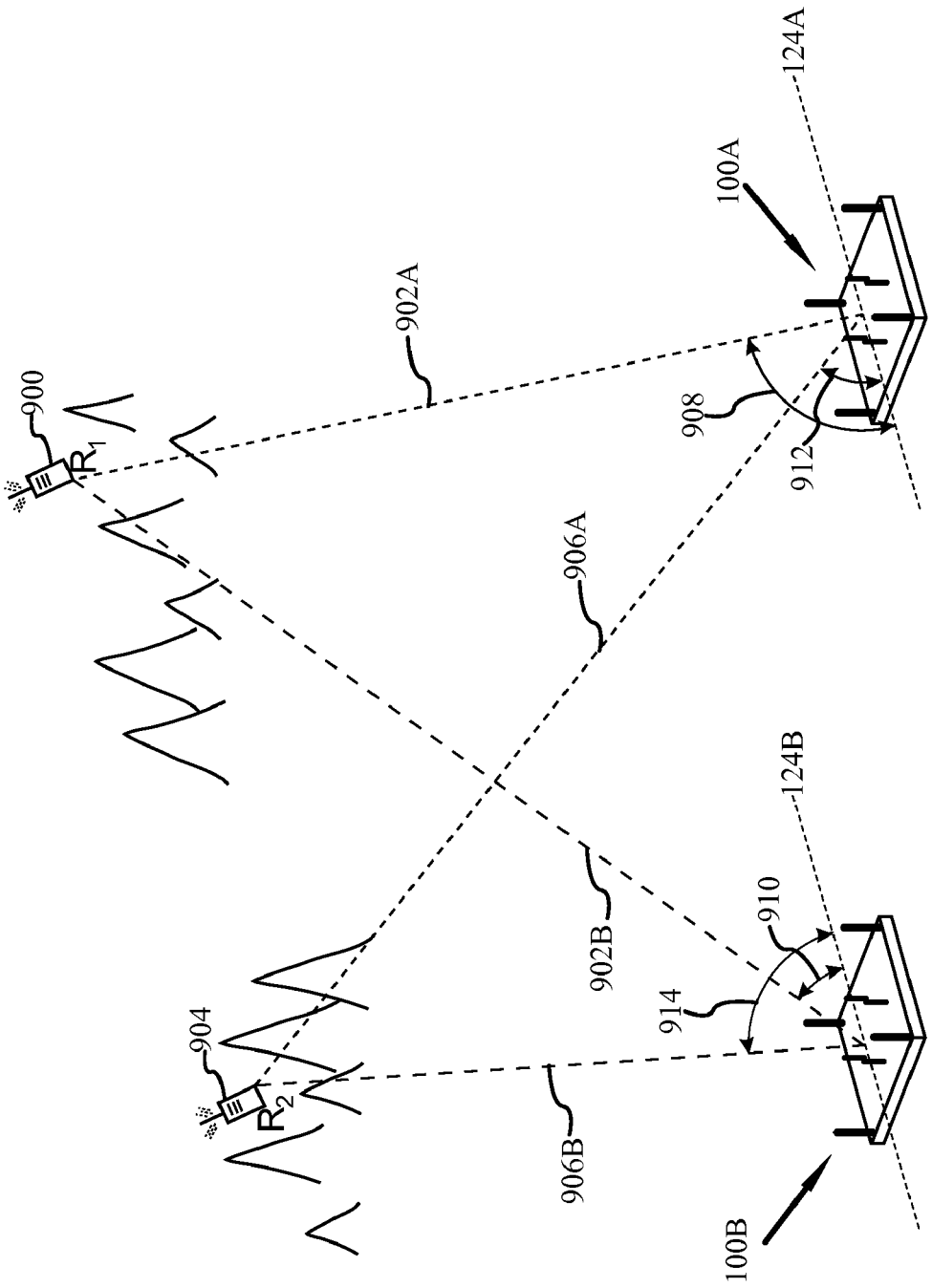
FIG. 9 is an illustration of multiple simultaneous radio detection and bearing systems used cooperatively to determine position.

In at least one embodiment, multiple SRDBS 100 units are deployed in the same environment, such as SRDBS 100A and SRDBS 100B shown in FIG. 9. Each is operable as described above. Moreover, SRDBS 100A detects radio 900 by receiving radio signal 902A and SRDBS 100B detects radio 900 by receiving radio signal 902B. Similarly SRDBS 100A detects radio 904 by receiving radio signal 906A and SRDBS 100B detects radio 904 by receiving radio signal 906B. SRDBS 100A determines the bearing 908 to radio 900, and likewise SRDBS 100B determines the bearing 910 to radio 900. SRDBS 100A determines the bearing 912 to radio 904, and likewise SRDBS 100B determines the bearing 914 to radio 904.

With a plurality of bearings determined to radios 900 and 904, SRDBS 100A and SRDBS 100B in cooperation with one another permit not only the simultaneous detection of radios 900 and 904 and their respective bearing, but also through triangulation the actual position of radios 900 and 904 based on the known positions of SRDBS 100A and SRDBS 100B. The use of additional SRDBS 100 units permits greater accuracy in the determined locations.

The processor 158 of SRDBS 100 is in at least one embodiment a specialized processor with memory, storage devices and input and output devices specifically dedicated to the signal detection and bearing determination as described above. For ease in manufacturing, upgrade and flexibility, in at least one embodiment the processor 158 is the central processing unit (CPU) of a general purpose computer, such as a laptop.

Figure 10:
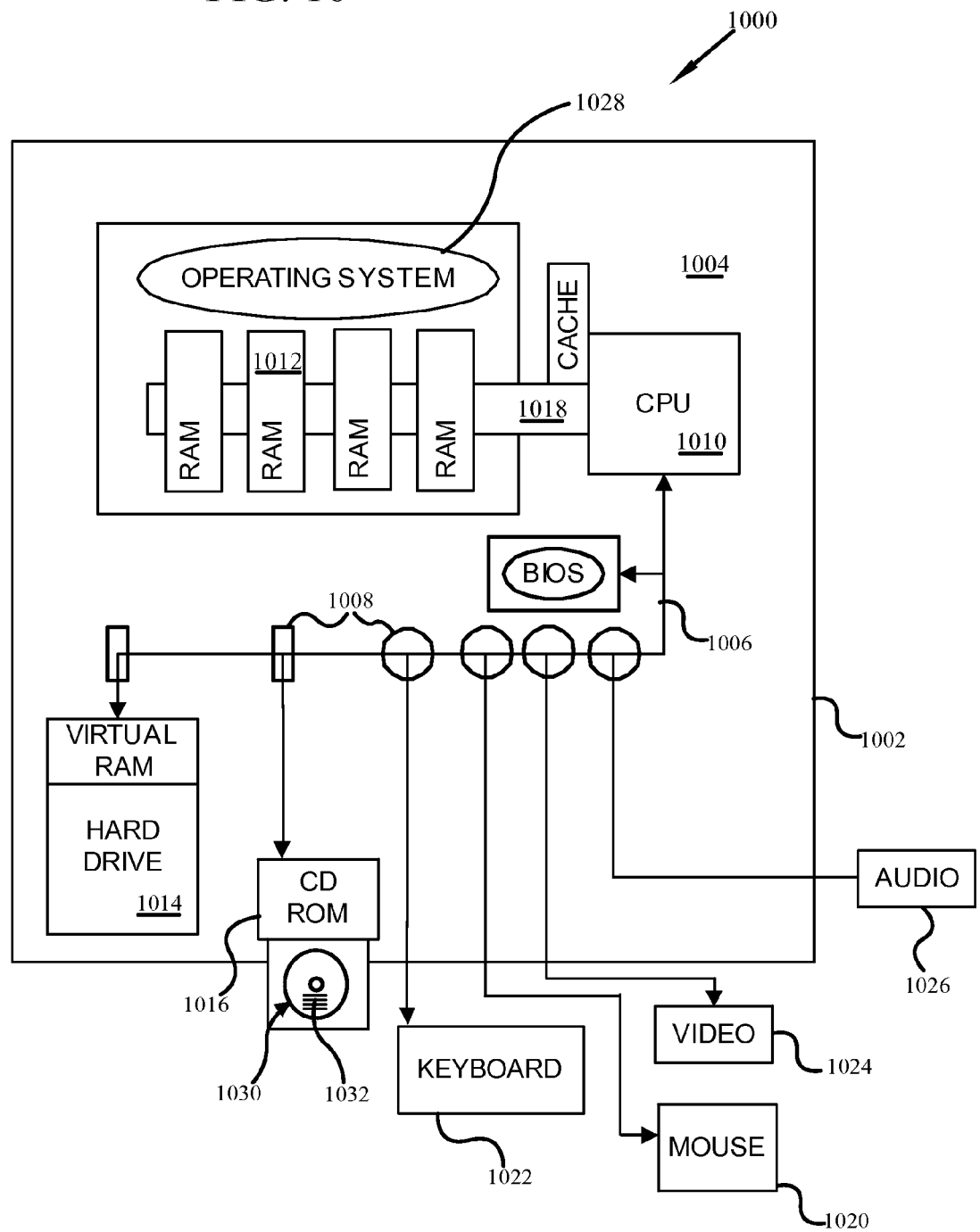
FIG. 10 is a block diagram of a computer system providing a processor in accordance with at least one embodiment.

With respect to the above description of SRDBS 100 and method 500, it is understood and appreciated that the method may be rendered in a variety of different forms of code and instruction as may be preferred for different computer systems and environments. To expand upon the initial suggestion of a computer implementation suggested above, FIG. 10 is a high level block diagram of an exemplary computer system 1000. Computer system 1000 has a case 1002, enclosing a main board 1004. The main board has a system bus 1006, connection ports 1008, a processing unit, such as Central Processing Unit (CPU) 1010 and a memory storage device, such as main memory 1012, hard drive 1014 and CD/DVD ROM drive 1016.

Memory bus 1018 couples main memory 1012 to CPU 1010. A system bus 1006 couples hard drive 1014, CD/DVD ROM drive 1016 and connection ports 1008 to CPU 1010. Multiple input devices may be provided, such as for example a mouse 1020 and keyboard 1022. Multiple output devices may also be provided, such as for example a video monitor 1024, audio system 1026 and a printer (not shown).

Computer system 1000 may be a commercially available system, such as a desktop, or for field applications perhaps more appropriately a laptop or even PDA unit provided by IBM, Dell Computers, Gateway, Apple, Sun Micro Systems, or other computer system provider. Computer system 1000 may also be a networked computer system, wherein memory storage components such as hard drive 1014, additional CPUs 1010 and output devices such as printers are provided by physically separate computer systems commonly connected together in the network. Those skilled in the art will understand and appreciate that physical composition of components and component interconnections comprising computer system 1000, and select a computer system 1000 suitable for the schedules to be established and maintained.

When computer system 1000 is activated, preferably an operating system 1028 will load into main memory 1012 as part of the boot strap startup sequence and ready the computer system 1000 for operation. At the simplest level, and in the most general sense, the tasks of an operating system fall into specific categories—process management, device management (including application and user interface management) and memory management.

In such a computer system 1000, the CPU 1010 is operable to perform one or more of the tasks associated with the method of simultaneous radio detection and bearing determination methods as described above. Those skilled in the art will understand that a computer-readable medium 1030 on which is a computer program 1032 for simultaneous radio detection and bearing determination may be provided to the computer system 1000. The form of the medium 1030 and language of the program 1032 are understood to be appropriate for computer system 1000. Utilizing the memory stores, such as for example one or more hard drives 1014 and main system memory 1012, the operable CPU 1002 will read the instructions provided by the computer program 1032 and operate to perform the scheduling system 100 as described above.

Moreover in at least one embodiment, aspects of the method, such as the application of the FFT to the time domain snapshot to provide the Frequency Spectrum, the comparison of the spectrum to a threshold and the corresponding identification of signals breaching the threshold, the adjustment of the threshold, the computation of bearing, and/or the recording and outputting of the determined information to a data storage device, remote location or both are operations enabled as executable instructions for a computer enabled system, e.g. processor 158. The contemporaneous transformation of one or more detected radio signals within a given frequency domain into a quantified bearing, frequency and audio recording of the transmission is a highly advantageous ability of SRDBS 100.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed:

1. A simultaneous radio detection and bearing system, comprising:
    an RF conditioning subsystem having a plurality of arrays of Frequency Range signal receiving channels, the RF conditioning subsystem operable to combine the signals from the arrays as a first internal data stream;
    a coherent multi-channel digitizer subsystem coupled to the RF conditioning system, the coherent multi-channel digitizer subsystem operable to generate a time domain snapshot of the first internal data stream;
    an audio recording subsystem coupled to the RF conditioning subsystem; and
    a processor coupled to the coherent multi-channel digitizer subsystem and the audio recording subsystem, the processor operable to transform the time domain snapshot to a frequency spectrum and identify at least one signal above a threshold at a determined frequency, determine the bearing of the signal, and provide the determined frequency of a selected identified signal to the audio recording subsystem, the audio subsystem contemporaneously recording the selected signal upon the determined frequency.

2. The simultaneous radio detection and bearing system of claim 1, having an array of First Frequency Range signal receiving channels and an array of Second Frequency signal receiving channels.

3. The simultaneous radio detection and bearing system of claim 2, having an at least one additional array of Third Frequency Range signal receiving channels.

4. The simultaneous radio detection and bearing system of claim 1, wherein each array of Frequency Range signal receiving channels is different and each is selected from the group consisting of LF, MF, HF, VHF, UHF, SHF, EHF and combinations thereof.

5. The simultaneous radio detection and bearing system of claim 1, wherein the simultaneous radio detection and bearing system is portable.

6. A simultaneous radio detection and bearing system, comprising:
    an RF conditioning subsystem having a plurality of First Frequency Range and Second Frequency Range signal receiving channels, the RF conditioning subsystem operable to combine First Frequency Range and Second Frequency Range signals as a first internal data stream;
    a coherent multi-channel digitizer subsystem coupled to the RF conditioning system, the coherent multi-channel digitizer subsystem operable to generate a time domain snapshot of the first internal data stream;
    an audio recording subsystem coupled to the RF conditioning subsystem; and a processor coupled to the coherent multi-channel digitizer subsystem and the audio recording subsystem, the processor operable to transform the time domain snapshot to a frequency spectrum and identify at least one signal above a threshold at a determined frequency, determine the bearing of the signal, and provide the determined frequency of a selected identified signal to the audio recording subsystem, the audio subsystem contemporaneously recording the selected signal upon the determined frequency.

7. The simultaneous radio detection and bearing system of claim 6, wherein the RF conditioning subsystem includes an array of at least four First Frequency Range antennas and an array of at least four Second Frequency Range antennas, arranged as concentric squares.

8. The simultaneous radio detection and bearing system of claim 6, wherein the First Frequency Range channels include active antennas.

9. The simultaneous radio detection and bearing system of claim 6, wherein the RF conditioning subsystem is a receiver and block down converter, the first internal data stream being an analog intermediate frequency signal.

10. The simultaneous radio detection and bearing system of claim 6, wherein the RF conditioning subsystem is a digital receiver and filter, the first internal data stream being a digital signal.

11. The simultaneous radio detection and bearing system of claim 6, wherein for a detected signal each detecting channel has a respective phase of the signal, the bearing determined by a best match process of comparing each respective phase to a database of calibration values for three hundred and sixty degrees of bearings.

12. The simultaneous radio detection and bearing system of claim 6, wherein the First Frequency Range signal receiving channels and the Second Frequency Range signal receiving channels are different and each is selected from the group consisting of LF, MF, HF, VHF, UHF, SHF, EHF and combinations thereof.

13. The simultaneous radio detection and bearing system of claim 6, wherein the First Frequency Range is the VHF frequency range and the Second Frequency Range is the UHF frequency range.

14. The simultaneous radio detection and bearing system of claim 6, wherein the system is operable to detect UHF signals in a range of about 462 MHz~467 MHz and VHF signals in a range of about 138 MHz~174 MHz.

15. The simultaneous radio detection and bearing system of claim 6, further including a sustainable power supply.

16. The simultaneous radio detection and bearing system of claim 15, wherein the sustainable power supply is a solar array.

17. The simultaneous radio detection and bearing system of claim 6, further including a GPS subsystem and digital compass, the bearing of the signal determined with reference to a GPS determined position and digital compass reference axis.

18. The simultaneous radio detection and bearing system of claim 6, wherein the simultaneous radio detection and bearing system is portable.

19. The simultaneous radio detection and bearing system of claim 6, wherein the system is camouflaged.

20. The simultaneous radio detection and bearing system of claim 6, wherein the system is about twenty inches square by about 6 inches high.

21. The simultaneous radio detection and bearing system of claim 6, wherein a plurality of radio detection and bearing systems permits contemporaneous determination of an identified signal location in addition to frequency and bearing.

22. A simultaneous radio detection and bearing system, comprising:
an RF receiver and block down converter subsystem operable to receive First Frequency Range and Second Frequency Range signals on at least four channels and provide a combined intermediate analog frequency signal;
a coherent multi-channel digitizer subsystem coupled to the receiver and block down converter subsystem, the coherent multi-channel digitizer subsystem operable to receive the combined intermediate analog frequency and render a time domain snapshot for the frequency domain;
a processor coupled to the coherent multi-channel digitizer subsystem, the processor operable to transform the time domain snapshot to a frequency spectrum and identify at least one signal at a determined frequency and contemporaneously determine the bearing of the signal based on a comparison of signal phase established by the coherent multi-channel digitizer; and
an audio recording subsystem coupled to the receiver and block down converter subsystem and the processor, the audio subsystem operable to demodulate and record an audio signal from the analog intermediate frequency signal on the determined frequency provided by the processor.

23. The simultaneous radio detection and bearing system of claim 22, wherein the receiver and block down converter subsystem includes at least four First Frequency Range and four Second Frequency Range antenna arrays arranged as concentric squares.

24. The simultaneous radio detection and bearing system of claim 23, wherein the four First Frequency Range antennas are active antennas.

25. The simultaneous radio detection and bearing system of claim 22, wherein the audio recording subsystem includes a plurality of simultaneously operable radios.

26. The simultaneous radio detection and bearing system of claim 22, wherein the multi channel digitizer is provided by two coherent dual channel digitizers.

27. The simultaneous radio detection and bearing system of claim 22, wherein for a detected signal each detecting channel has a respective phase of the signal, the bearing determined by a best match process of comparing each respective phase to a database of calibration values for three hundred and sixty degrees of bearings.

28. The simultaneous radio detection and bearing system of claim 22, wherein the First Frequency Range is the VHF frequency range and the Second Frequency Range is the UHF frequency range.

29. The simultaneous radio detection and bearing system of claim 22, wherein the system is operable to detect UHF signals in a range of about 462 MHz~467 MHz and VHF signals in a range of about 138 MHz~174 MHz.

30. The simultaneous radio detection and bearing system of claim 22, further including a sustainable power supply.

31. The simultaneous radio detection and bearing system of claim 22, wherein a plurality of radio detection and bearing systems permits contemporaneous determination of an identified signal location in addition to frequency and bearing.

32. A method of simultaneous radio detection and bearing, comprising:
providing an RF receiver and conditioning subsystem having at least four First Frequency Range channels and Second Frequency Range channels;

sampling the First Frequency Range and Second Frequency Range spectrum each in a predetermined range;
converting the samples into a first internal data stream;
simultaneously providing the internal signal to a digitizer subsystem and an audio recording subsystem;
digitizing the internal signal at predetermined intervals to provide a time domain snapshot;
transforming the time domain snapshot with a FFT to provide a frequency spectrum; and
comparing the frequency spectrum to a threshold to identify keyed signals;
in response to at least one identified keyed signal, determining the frequency of the signal and the bearing of the signal about simultaneously, and for a selected identified signal, engaging the audio subsystem to demodulate the internal signal at the determined frequency and record the selected identified signal, the recording of the signal being and the determination of bearing being about contemporaneously; and
outputting the identified signal frequency, bearing and selected signal recording.

33. The method of claim 32, wherein selection of an identified signal is based on availability of a radio in the audio subsystem.

34. The method of claim 32, wherein selection of an identified signal is based on a priority determination of the identified signal.

35. The method of claim 32, wherein the priority determination is based on at least one factor selected from the group of, signal strength, a priority frequency, past frequency of use, and combinations thereof.

36. The method of claim 32, wherein for a detected signal each detecting channel has a respective phase of the signal, the bearing determined by a best match process of comparing each respective phase to a database of calibration values for three hundred and sixty degrees of bearings.

37. The method of claim 32, wherein the first internal data stream is an analog intermediate frequency signal.

38. The method of claim 32, wherein the first internal data stream is a digital signal.

39. The method of claim 32, wherein the output of the identified signal frequency, bearing and recording is stored to a database.

40. The method of claim 32, wherein the First Frequency Range is the VHF frequency range and the Second Frequency Range is the UHF frequency range.

41. The method of claim 32, wherein the method is operable to detect UHF signals in a range of about 462 MHz~467 MHz and VHF signals in a range of about 138 MHz~174 MHz.

42. The method of claim 32, wherein the method is performed by interconnected components including:
an RF conditioning subsystem having a plurality of First Frequency Range and Second Frequency Range signal receiving channels, the RF conditioning subsystem operable to combine First Frequency Range and Second Frequency Range signals as a first internal data stream;
a coherent multi-channel digitizer subsystem coupled to the RF conditioning system, the coherent multi-channel digitizer subsystem operable to generate a time domain snapshot of the first internal data stream;
an audio recording subsystem coupled to the RF conditioning subsystem; and
a processor coupled to the coherent multi-channel digitizer subsystem and the audio recording subsystem, the processor operable to transform the time domain snapshot to a frequency spectrum and identify at least one signal above a threshold at a determined frequency, determine the bearing of the signal, and provide the determined frequency of a selected identified signal to the audio recording subsystem, the audio subsystem contemporaneously recording the selected signal upon the determined frequency.

43. The method of claim 32 performed by a plurality of radio detection and bearing systems each in a different location, the determined bearings permitting the determination of a location for each detected signal.

* * * * *